US012320484B2

(12) United States Patent
Bergerat et al.

(10) Patent No.: US 12,320,484 B2
(45) Date of Patent: Jun. 3, 2025

(54) LUMINOUS DEVICE FOR A VEHICLE

(71) Applicant: Flex-N-Gate France, Audincourt (FR)

(72) Inventors: Stéphanie Bergerat, Audincourt (FR); Olivier Pujol, Belfort (FR)

(73) Assignee: Flex-N-Gate France, Audincourt (FR)

(*) Notice: Subject to any disclaimer, the term of this patent is extended or adjusted under 35 U.S.C. 154(b) by 0 days.

(21) Appl. No.: 18/896,313

(22) Filed: Sep. 25, 2024

(65) Prior Publication Data

US 2025/0102126 A1 Mar. 27, 2025

(30) Foreign Application Priority Data

Sep. 25, 2023 (FR) ....................................... 2310119

(51) Int. Cl.

| | |
|---|---|
| ***F21S 41/20*** | (2018.01) |
| ***F21S 41/141*** | (2018.01) |
| ***F21S 41/36*** | (2018.01) |
| ***F21S 43/14*** | (2018.01) |
| ***F21S 43/15*** | (2018.01) |
| ***F21S 43/20*** | (2018.01) |
| ***F21S 43/31*** | (2018.01) |
| ***F21Y 115/10*** | (2016.01) |

(52) U.S. Cl.

CPC ........... *F21S 41/285* (2018.01); *F21S 41/141* (2018.01); *F21S 41/36* (2018.01); *F21S 43/14* (2018.01); *F21S 43/15* (2018.01); *F21S 43/265* (2024.05); *F21S 43/31* (2018.01); *F21Y 2115/10* (2016.08)

(58) Field of Classification Search

CPC ........ F21S 41/285; F21S 41/36; F21S 41/141; F21S 43/14; F21S 43/31; F21S 43/15; F21S 43/265

See application file for complete search history.

(56) References Cited

U.S. PATENT DOCUMENTS

| | | | | |
|---|---|---|---|---|
| 5,490,049 A * | 2/1996 | Montalan .......... | F21S 43/26241 362/240 |
| 2004/0257790 A1* | 12/2004 | Tanaka ................. | B60Q 1/2669 362/23.07 |
| 2016/0102832 A1* | 4/2016 | Baccarin ............... | F21S 43/247 362/509 |
| 2019/0017676 A1* | 1/2019 | Van Straten .......... | F21S 41/141 |
| 2020/0025352 A1 | 1/2020 | Kumagai et al. | |

(Continued)

FOREIGN PATENT DOCUMENTS

| | | |
|---|---|---|
| DE | 102017114476 A1 | 1/2019 |
| DE | 102017120532 A1 | 3/2019 |

OTHER PUBLICATIONS

French Search Report corresponding to application FR 2310119, dated May 3, 2024, 2 pages.

*Primary Examiner* — Bryon T Gyllstrom

(74) *Attorney, Agent, or Firm* — Reising Ethington P.C.

(57) ABSTRACT

A luminous device that includes: an illuminated element having an illuminated zone and an opaque zone adjacent the illuminated zone; and a lighting device arranged to illuminate the illuminated zone extending on the side of the inner surface of the illuminated element. The outer surface of the illuminated zone has a rounded shape forming a convex protuberance on the outer surface of the illuminated element, the lighting device emitting light toward the illuminated element, the light traveling through the illuminated zone of the inner surface to the convex protuberance of the illuminated zone.

10 Claims, 3 Drawing Sheets

(56) References Cited

U.S. PATENT DOCUMENTS

| | | | | |
|---|---|---|---|---|
| 2020/0224847 | A1* | 7/2020 | Li | F21S 43/14 |
| 2021/0190285 | A1* | 6/2021 | Demontoux | F21S 45/10 |
| 2021/0247045 | A1 | 8/2021 | Simchak | |
| 2021/0388966 | A1* | 12/2021 | Ruan | F21V 31/005 |
| 2022/0065417 | A1* | 3/2022 | Park | F21S 41/148 |

* cited by examiner

LUMINOUS DEVICE FOR A VEHICLE

TECHNICAL FIELD

The present invention relates to a luminous device for a vehicle, of the type comprising: an illuminated element extending between an inner surface and an outer surface, the illuminated element comprising at least one illuminated zone arranged to let light pass from the inner surface to the outer surface and at least one opaque zone adjacent to the illuminated zone and arranged to prevent the passage of light from the inner surface to the outer surface, the illuminated zone extending along a path substantially perpendicular to a direction of thickness from the inner surface to the outer surface, a lighting device arranged to light the illuminated zone along the entire path of said illuminated zone, said lighting device extending on the side of the inner surface of the illuminated element and being arranged to emit light into the illuminated zone.

BACKGROUND

The luminous device is e.g. a vehicle headlight and/or a signaling device and/or a decorative part of the vehicle body. More particularly, the vehicle is a motor vehicle.

In order to give a particular appearance to such a luminous device, it is known to use one or a plurality of optical fibers into which light is injected, which serves to form particular illuminated shapes along the path followed by the optical fibers and to impart a particularly satisfactory appearance to the luminous device.

However, the use of optical fibers involves a number of requirements. Indeed, the installation of optical fibers involves making same follow the desired path and preventing the fibers from moving away therefrom during the mounting of the luminous device, which complicates the assembly of the luminous device. Furthermore, in order to obtain satisfactory lighting, the optical fibers are made of expensive materials and are illuminated by means of laser diodes, which are also expensive. Furthermore, the optical efficiency of such installation is not optimal, which requires increasing the energy consumption of the luminous device to obtain satisfactory lighting. In addition, the use of laser diodes requires special safety precautions for people looking at the luminous device, in order to protect them from the laser radiation, which further complicates the assembly of the luminous device.

SUMMARY

One of the goals of the invention is to overcome such drawbacks by proposing an inexpensive luminous device, providing an equally satisfactory appearance and simplified assembly.

To this end, the invention relates to a luminous device of the aforementioned type, wherein the outer surface of the illuminated zone has a rounded shape forming a convex protuberance on the outer surface of the illuminated element, the convexity of the convex protuberance extending toward the outside of the illuminated element, the lighting device emitting light toward the illuminated element along the direction of thickness, the light traveling through the illuminated zone from the inner surface to the convex protuberance of the illuminated zone.

The shape of the illuminated zone serves to impart to said zone the appearance of an optical fiber whereas the zone can be made of an inexpensive material, e.g. by injection molding, which leads to making any path to the illuminated zone follow any type of path in a particularly simple manner. In addition, the illuminated zone can be illuminated by a conventional light source, not involving the use of a laser. Thereby, the appearance of the luminous device according to the invention is as satisfactory as a luminous device using optical fibers, whereas being simpler and less expensive to produce.

The luminous device according to the invention can further comprise one or a plurality of the following features, taken individually or according to any technically conceivable combination:

- the lighting device comprises a plurality of light sources, said light sources being distributed along the path of the illuminated zone, each light source emitting light along the direction of thickness toward the inner surface of the illuminated zone;
- the light sources are spaced apart from the inner surface of the illuminated element along the direction of thickness, the lighting device comprising two reflective walls extending along the direction of thickness along the path of the illuminated zone between the light sources and the inner surface of the illuminated element, the light sources emitting light between said reflective walls towards the inner surface of the illuminated zone;
- the light sources are light emitting diodes mounted on a same strip of printed circuit;
- the inner surface of the illuminated zone is substantially flat, said illuminated zone having a semi-cylindrical cross-section in a plane containing the direction of thickness;
- the illuminated element is of one piece made by injection of two materials, one of said materials allowing light to pass and forming the illuminated zone and the other of the materials preventing the passage of light and forming the opaque zone;
- the illuminated element comprises a plurality of spaced apart illuminated zones, adjacent illuminated zones being separated from each other by an opaque zone;
- the luminous device comprises a lighting device for each illuminated zone.
- the illuminated zones extend along paths that are substantially parallel to each other;
- the illuminated element and the illuminating device extend in a housing, said housing comprising a bottom, extending on the side of the inner surface of the illuminated element, the illuminating device extending between said bottom and said illuminated element, and a front facing the outer surface of the illuminated element, said front face letting the light illuminating the outer surface of the illuminated zone of the illuminated element pass through.

BRIEF DESCRIPTION OF THE DRAWINGS

Other aspects and advantages of the invention will become clearer upon reading the following description, given only as a non-limiting example, and made with reference to the enclosed drawings, wherein.

DETAILED DESCRIPTION

With reference to the figures, a luminous device 1 for a vehicle is described, comprising an illuminated element 2 and a lighting device 4. Such a lighting device is e.g. a vehicle headlight and/or a signaling device and/or a decorative part of the body of the vehicle. Such a luminous device is thereby intended to be visible from outside the vehicle.

Figure 1:
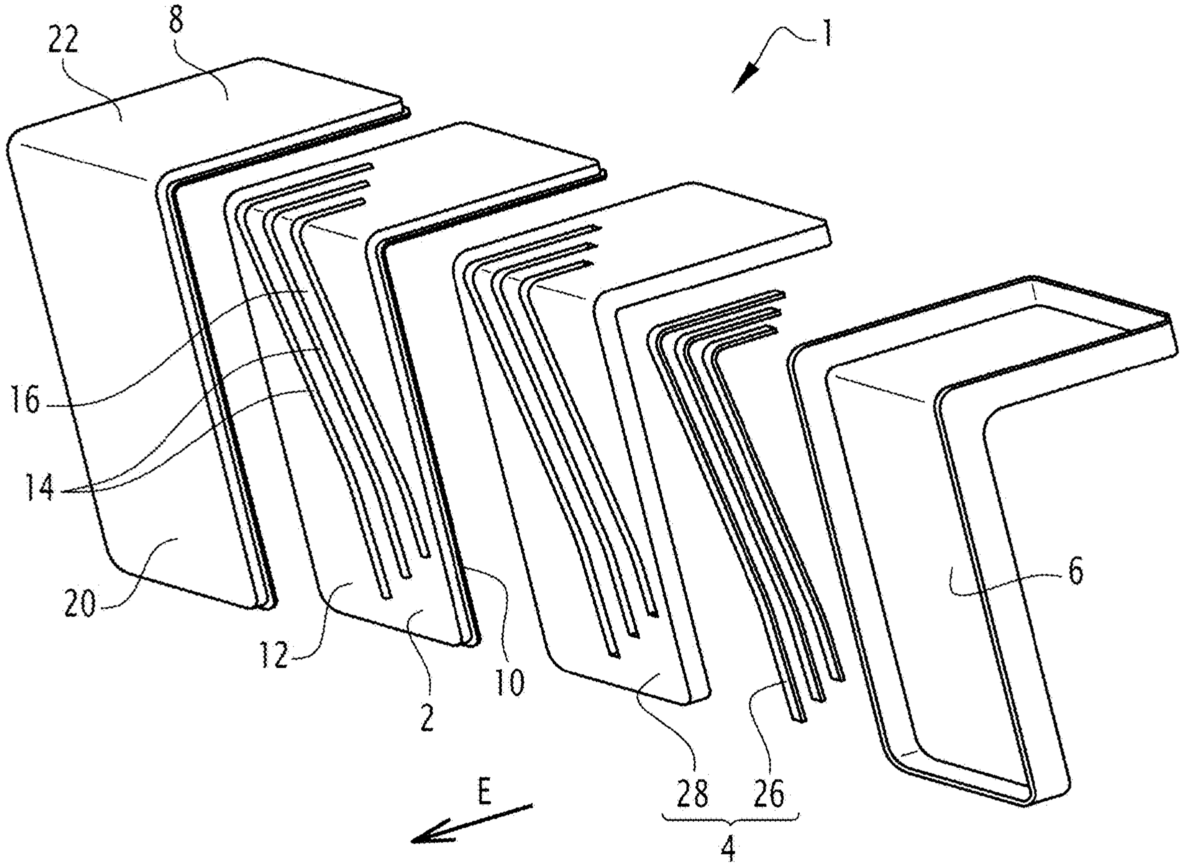
FIG. 1 is a schematic exploded perspective representation of a luminous device according to an embodiment of the invention.

According to the embodiment shown in FIG. 1, the assembly formed by the illuminated element 2 and the lighting device 4 is placed in a housing comprising a bottom 6 and a front face 8. The bottom 6 forms an inner wall of the luminous device 1, intended to be oriented toward the body of the vehicle on which the luminous device is installed, and the front face 8 forms an outer wall of the luminous device 1, intended to face the outside of the vehicle so as to be visible from the outside of the vehicle. Thereby, in the description, the term "inner" or "interior" refers to what is intended to be oriented toward the body of the vehicle and the term "outer" or "exterior" refers to what is intended to be oriented towards the outside of the vehicle. The bottom 6 and the front face 8 are assembled together so as to define an inner volume receiving the illuminated element 2 and the lighting device 4. The front face 8 is arranged to let light pass from the inner volume to the outside of the front face 8. Thereby, the front face 8 consists e.g. of a transparent or transparent window.

The illuminated element 2 extends between an inner surface 10 and an outer surface 12 along a direction of thickness E going from the inner surface 10 to the outer surface 12. When the illuminated element 2 is arranged in a housing, as described herein above, the inner surface 10 is oriented toward the bottom 6 and the outer surface 12 extends opposite the front face 8, e.g. against the front face 8.

Figure 3:
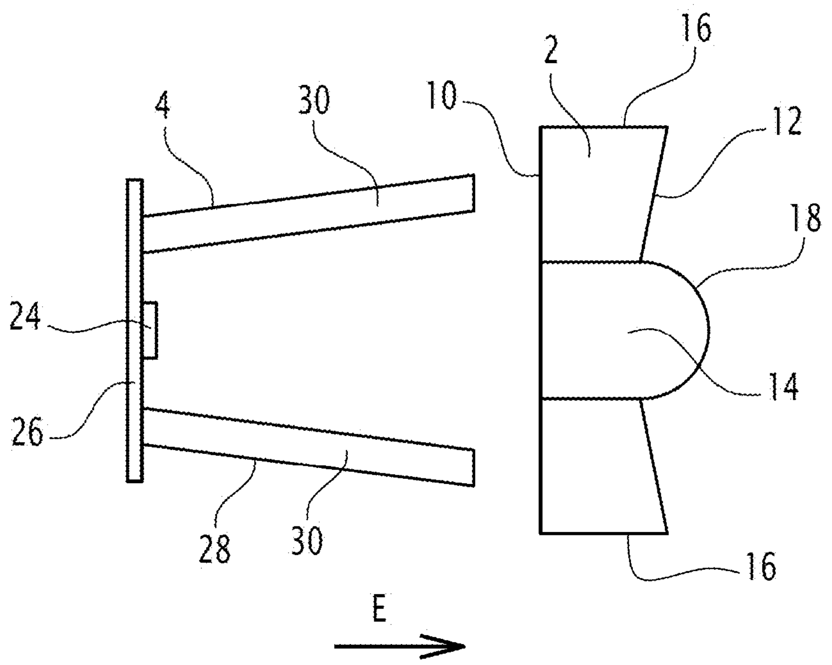
FIG. 3 is a schematic sectional view of a part of the luminous device showing more particularly an illuminated zone and the lighting device for the illuminated zone.

The illuminated element 2 comprises at least one illuminated zone 14 and at least one opaque zone 16, these zones extending over the entire thickness of the illuminated element 2, i.e. from the inner surface 10 to the outer surface 12 of the illuminated element 2, as can be seen more particularly in FIG. 3. The opaque zone 16 is adjacent to the illuminated zone 14 in a longitudinal plane substantially perpendicular to the direction of thickness E. More particularly, the illuminated zone 14 is bordered by the opaque zone 16 which extends on both sides of the illuminated zone 14 in the longitudinal plane, as can be seen in FIGS. 1 and 3.

Advantageously, such an arrangement of the opaque zone 16 serves to concentrate the light in the illuminated zone 14 while preventing diffusion losses in said opaque zone 16.

The illuminated zone 14 is arranged let light pass along the direction of thickness E from the inner surface 10 to the outer surface 12. In other words, light injected into the illuminated zone 14 on the side of the inner face 10 is transmitted to the outer surface 12 of the illuminated zone 14, the light then being visible from outside the luminous device 1, e.g. through the front face 8. The illuminated zone is thereby made of a light-transmitting material, such as a transparent and/or diffusing material. According to one embodiment, the illuminated zone 14 is made of a transparent or diffusing plastic material.

The illuminated zone 14 has, on the side of the outer surface 12, a rounded shape forming a convex protuberance 18, the convexity of the protuberance 18 extending toward the outside of the illuminated element. The protuberance 18 is more particularly in the form of an arc of a circle, the center of the circle being situated between the inner surface 10 and the outer surface 12 of the illuminated zone 14. In other words, the protuberance 18 increases the thickness of the illuminated zone 14 along the direction of thickness E, in particular at the top of the convexity of the protuberance 18, as shown in FIG. 3. On the side of the inner face 10, the illuminated zone 14 has e.g. a substantially plane surface so that the illuminated zone has a semi-cylindrical cross-section in a plane containing the direction of thickness E, as is visible in FIG. 3. According to one example, the greatest thickness of the illuminated zone 14, corresponding to the distance between the inner surface 10 and the top of the protuberance 18, is less than or equal to 3 mm, e.g. substantially comprised between 2 mm and 3 mm. Furthermore, the width of the protuberance 18, corresponding to the diameter of the arc of a circle formed by the protuberance 18, is e.g. substantially comprised between 1 mm and 4 mm. Thereby, the illuminated zone 14 has a certain "fineness", which improves the appearance thereof and reinforces the impression that the illuminated zone 14 is formed by an optical fiber, as will be subsequently described in more detail.

The illuminated zone 14 extends along a path, along at least one direction substantially perpendicular to the direction of thickness E, i.e. in a longitudinal plane. The path of the illuminated zone 14 defines the shape of the illuminated zone 14 which will be visible from the outside of the luminous device 1. The path may have any desired shape, e.g. to form a logo, a distinctive sign or other. According to the embodiment shown in FIG. 1, the path is substantially rectilinear and comprises a change of direction because of the general shape of the luminous device 1 which comprises a main part 20 intended to extend along the direction of elevation of the vehicle and a shoulder 22 substantially perpendicular to the main part 20. The path then comprises a section extending rectilinearly in the main part 20 and a section extending rectilinearly in the shoulder 22, as shown in FIG. 1. However, it should be understood that such shape is given only as an example and that the path could have another shape, as indicated hereinabove.

Figure 2:
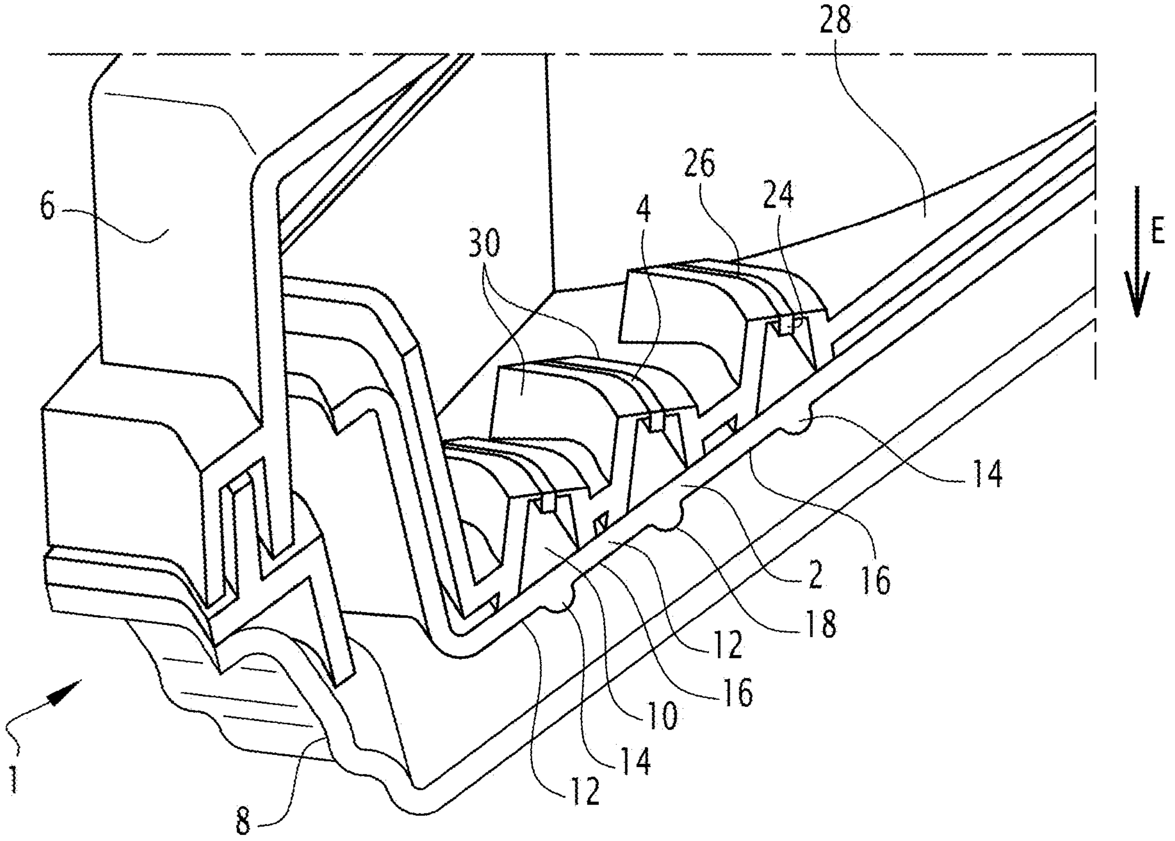
FIG. 2 is a schematic partial sectional representation of a part of the luminous device shown in FIG. 1.

According to the embodiment shown in FIGS. 1 and 2, the illuminated element 2 comprises a plurality of illuminated zones 14 spaced apart from one another in the longitudinal plane. Two adjacent illuminated zones 14 are then separated by an opaque zone 16 or by the opaque zone 16, as is more particularly visible in FIG. 1. According to the embodiment shown in FIG. 1, the illuminated zones 14 extend along paths parallel to one another and each comprise a section extending rectilinearly in the main part 20 and a section extending rectilinearly in the shoulder 22. However, it should be understood that the paths of the illuminated zones could be different from one another, e.g. in order to produce a pattern in the outer surface 12 of the illuminated element 2.

The opaque zone 16 is arranged to block the passage of light along the direction of thickness E from the inner surface 10 to the outer surface 12. The opaque zone 16 is thereby made of a material preventing light transmission, such as an opaque material. According to one embodiment, the opaque zone 16 is made of an opaque plastic material.

The opaque zone 16 surrounds one or a plurality of illuminated zones 14 so that, when the illuminated element 2 is illuminated from the inner surface 10, only the light passing through the illuminated zone or zones 14 is visible on the side of the outer surface 12 of the illuminated element 2. When the path of the illuminated zones 14 extends over an entire dimension of the illuminated element 2 in a longitudinal plane, e.g. over the entire length or the entire height of the illuminated element 2, a plurality of opaque zones 16 are provided to extend between the different illuminated zones 14.

According to one embodiment, the opaque zone or zones 16 have a thickness less than the thickness of the illuminated zone or zones 14 so that the protuberance 18 of each illuminated zone 14 protrudes outwards from the outer surface 12 of the opaque zone or zones 16, as can be seen more particularly in FIGS. 2 and 3. Thereby, seen from the outside, the illuminated element 2 gives the impression that one or a plurality of optical fibers are integrated into a support formed by the opaque zone or zones 16, which gives a particularly satisfactory appearance to the illuminated element 2 from outside the luminous device 1.

According to one embodiment, the illuminated element 2 is made in one piece, i.e. the illuminated zone or zones 14 are integral with the opaque zone or zones 16. Thereby, the illuminated element 2 is e.g. produced by injection molding of two materials, one forming the illuminated zone or zones 14 and the other forming the opaque zone or zones 16. Thereby, the illuminated element 2 is particularly simple to produce and makes it possible to produce paths of illuminated zones of any desired shape, simply by arranging the molding cavity in the appropriate manner. In particular, the production of the illuminated element 2 does not require any operation of assembling the illuminated zones along the desired path on a support, as is the case when optical fibers are used.

The lighting device 4 is arranged to illuminate an illuminated zone 14 of the illuminated element 2 from the inside of the illuminated element 2. Thereby, when the assembly formed by the illuminated element 2 and the illuminating device 4 is arranged in a housing, the illuminating device extends between the bottom 6 and the illuminated element 2. The lighting device 4 is more particularly arranged to inject light into the illuminated zone by passing through the inner surface 10 of the illuminated zone 14, the light being transmitted to the convex protuberance 18 of the illuminated zone 14 so as to be visible from the outside of the luminous device 1. In other words, the luminous device is arranged to emit light along the direction of thickness E toward the illuminated zone 14, the light passing through the illuminated zone 14 from the inner surface 10 to the convex protuberance 18. More particularly, the illuminated zone 14 is illuminated over the whole the path thereof.

To this end, the lighting device 4 comprises a plurality of light sources 24, one of which is shown in FIG. 3, distributed along the path of the illuminated zone 14, each light source emitting light along the direction of thickness E toward the inner surface of the illuminated zone 14. The light sources are e.g, formed by light-emitting diodes mounted on the same strip of printed circuit 26 arranged to supply and control the light-emitting diodes. The strip of printed circuit 26 extends along the path of the illuminated zone 14 so as to place the light sources 24 opposite the entire illuminated zone 14, as can be seen in FIG. 1.

According to one embodiment, in order to direct and concentrate the light emitted by the light sources 24 toward the illuminated zone, the lighting device 4 further comprises a reflection device 28 comprising two reflecting walls 30 extending substantially along the direction of thickness E of the light sources 24 on the inside surface 12 of the illuminated zone 14. Thereby, the light sources 24 are spaced from the inner surface 10 of the illuminated zone along the direction of thickness E and the reflection device 28 serves to bring the light emitted by the light sources 24 to the illuminated zone 14. The distance separating the light sources 24 from the convex protuberance 18 is e.g. substantially comprised between 15 mm and 20 mm. The walls 30 extend along the path of the illuminated zone 14 on both sides thereof, as can be seen more particularly in FIGS. 2 and 3. The printed circuit strip 26 is e.g. fastened to the ends of the walls 30 so that the light sources 24 are placed between the walls 30 so that the light emitted by the light sources 24 is entirely emitted between the walls 30 toward the inner surface 10 of the illuminated zone.

The luminous device comprises a lighting device 4 as described above by illuminated zone 14, as shown in FIGS. 1 and 2. According to the embodiment shown in said figures, the reflection devices 28 of all the lighting devices 24 are made in one piece, e.g. produced by injection molding. The part forming the reflection devices 28 has e.g. a contour substantially identical to the contour of the illuminated element 2 and to the contours of the bottom 6 and of the front face 8, as shown in FIG. 1. The part forming the reflection devices 28 comprises a plurality of pairs of reflecting walls 30 protruding from an inner surface of the part and to which the printed circuit strips 26 are fastened, e.g. by bonding, as shown in FIG. 2.

The luminous device 1 described hereinabove serves to obtain a particularly satisfactory appearance in a simple and inexpensive manner, in particular by "imitating" a luminous device produced by means of optical fibers without using such optical fibers, nor laser diodes used to illuminate optical fibers. The luminous device 1 further improves the safety of persons observing the luminous device 1 since the latter does not emit laser radiation.

The invention claimed is:

1. A luminous device for a vehicle, comprising:

an illuminated element extending between an inner surface and an outer surface, the illuminated element comprising at least one illuminated zone arranged to let light pass from the inner surface to the outer surface and at least one opaque zone adjacent to the illuminated zone and arranged to prevent the passage of light from the inner surface to the outer surface, the illuminated zone extending along a path substantially perpendicular to a direction of thickness from the inner surface to the outer surface, a lighting device arranged to illuminate the illuminated zone over the entire path of said illuminated zone, said lighting device extending on the side of the inner surface of the illuminated element and being arranged to emit light into the illuminated zone, wherein the outer surface of the illuminated zone has a rounded shape forming a convex protuberance on the outer surface of the illuminated element, the convexity of the convex protuberance extending outwardly of the illuminated element, the lighting device emitting light toward the illuminated element along the direction of thickness, the light traveling through the illuminated zone from the inner surface to the convex protuberance of the illuminated zone.

2. The luminous device according to claim 1, wherein the lighting device comprises a plurality of light sources, said light sources being distributed along the path of the illuminated zone, each light source emitting light along the direction of thickness towards the inner surface of the illuminated zone.

3. The luminous device according to claim 2, wherein the light sources are spaced from the inner surface of the illuminated element along the direction of thickness, the lighting device comprising two reflecting walls extending along the direction of thickness along the path of the illuminated zone between the light sources and the inner surface of the illuminated element, the light sources emitting light between said reflective walls towards the inner surface of the illuminated zone.

4. The luminous device according to claim 2, wherein the light sources are light emitting diodes mounted on a same strip of printed circuit.

5. The luminous device according to claim 1, wherein the inner surface of the illuminated zone is substantially planar, said illuminated zone having a semi-cylindrical cross-section in a plane containing the direction of thickness.

6. The luminous device according to claim 1, wherein the illuminated element is made in one piece by injection of two materials, one of the materials letting light pass and forming the illuminated zone and the other of the materials preventing the passage of light and forming the opaque zone.

7. The luminous device according to claim 1, wherein the illuminated element comprises a plurality of spaced apart illuminated zones, the adjacent illuminated zones being separated from each other by an opaque zone, the lighting device illuminating one of said illuminated zones.

8. The luminous device according to claim 7, comprising a lighting device for each illuminated zone.

9. The luminous device according to claim 7, wherein the illuminated zones extend along substantially parallel paths to each other.

10. The luminous device according to claim 1, wherein the illuminated element and the illuminating device extend in a housing, said housing comprising a bottom, extending on the side of the inner surface of the illuminated element, the lighting device extending between said bottom and said illuminated element, and a front face extending opposite the outer surface of the illuminated element, the front face letting pass the light illuminating the outer surface of the illuminated zone of the illuminated element.

* * * * *